United States Patent [19]
Tobin, Jr. et al.

[11] Patent Number: 5,982,920
[45] Date of Patent: Nov. 9, 1999

[54] AUTOMATED DEFECT SPATIAL SIGNATURE ANALYSIS FOR SEMICONDUCTOR MANUFACTURING PROCESS

[75] Inventors: Kenneth W. Tobin, Jr., Harriman; Shaun S. Gleason, Knoxville; Thomas P. Karnowski, Knoxville; Hamed Sari-Sarraf, Knoxville, all of Tenn.

[73] Assignee: Lockheed Martin Energy Research Corp. Oak Ridge National Laboratory, Oak Ridge, Tenn.

[21] Appl. No.: 08/780,569

[22] Filed: Jan. 8, 1997

[51] Int. Cl.[6] .................................................. G06K 9/00
[52] U.S. Cl. ..................................... 382/145; 382/224
[58] Field of Search ............................. 382/144, 145, 382/146, 147, 149, 150, 308, 218, 259, 286, 293, 141, 142, 143, 148, 151, 152, 181, 190, 195, 203, 209, 217, 224, 225; 348/87; 371/22.1; 364/490, 468.28; 702/35; 250/492.2, 559.42, 398; 438/17; 430/296; 324/158.1; 356/237

[56] References Cited

U.S. PATENT DOCUMENTS

| | | | |
|---|---|---|---|
| 4,500,789 | 2/1985 | Ban et al. | 250/492.2 |
| 4,999,785 | 3/1991 | Schmuter | 382/150 |
| 5,129,009 | 7/1992 | Lebeau | 382/149 |
| 5,256,578 | 10/1993 | Corley et al. | 437/8 |
| 5,479,252 | 12/1995 | Worster et al. | 356/237 |
| 5,539,752 | 7/1996 | Berezin et al. | 371/22.1 |

*Primary Examiner*—Leo H. Boudreau
*Assistant Examiner*—Bijan Tadayon
*Attorney, Agent, or Firm*—Morgan & Finnegan, LLP

[57] ABSTRACT

An apparatus and method for performing automated defect spatial signature analysis on a data set representing defect coordinates and wafer processing information includes categorizing data from the data set into a plurality of high level categories, classifying the categorized data contained in each high level category into user-labeled signature events, and correlating the categorized, classified signature events to a present or incipient anomalous process condition.

25 Claims, 10 Drawing Sheets

AUTOMATED DEFECT SPATIAL SIGNATURE ANALYSIS FOR SEMICONDUCTOR MANUFACTURING PROCESS

This invention was made with government support under Contract No. DE-AC05-840R21400 awarded by the U.S. Department of Energy to Lockheed Marietta Energy Systems, Inc. and the government has certain rights in this invention.

BACKGROUND OF THE INVENTION

1. Field of the Invention

The present invention relates generally to semiconductor manufacturing processes and inspection, and more specifically, to a method and apparatus for classifying semiconductor process signatures for the purpose of allowing semiconductor manufacturers to quickly improve their product yields.

2. Description of the Related Art

The continued trend in semiconductor manufacturing towards higher density devices and larger wafer formats, along with the increased application of optical image-based defect detection and review workstations for process monitoring has generated considerable amounts of data to be evaluated by fab production personnel. This data is necessary to evaluate the state of the manufacturing process to quickly diagnose process problems and to ultimately improve product yield.

The increased flow of information that must be quickly and correctly evaluated is resulting in data reduction schemes which may not make the most efficient or consistent use of the available information. These schemes primarily depend on human evaluation of large numbers of electronic "wafer maps" to characterize and correct the state of the manufacturing process. However, manual viewing and evaluation of these wafermaps results in a necessarily limited throughput of wafer data and is subject to broadly varying data interpretations such as subjective or inconsistent results and misclassifications due to operator fatigue or inexperience.

U.S. Pat. No. 4,500,789 to Ban et al. describes a method and apparatus for analyzing a wafer surface in which an electron beam is projected onto a desired pattern region. The acceleration voltage of the beam is set at a value at which the distribution of the scattered electrons in a predetermined region is substantially uniform. The exposure time of the electron beam is changed when pattern data is changed.

U.S. Pat. No. 5,256,578 to Corley et al. Describes a method and apparatus for integral semiconductor wafer map recording which comprises a semiconductor wafer having a plurality of individual die thereon. Tests produce data that generate wafer maps.

U.S. Pat. No. 5,479,252 to Worster et al. describes a laser imaging system used to analyze defects on semiconductor wafers that have been detected by patterned wafer defect detecting systems. The laser imaging system uses confocal laser scanning microscopy techniques.

These and other inspection techniques are generally known. In-line inspection of semiconductor wafer products is usually performed by using optical microscopy or light scattering devices to locate and electronically map defect coordinates on a semiconductor wafer. The electronic wafer map is currently developed for approximately 10–20% of all wafers and subsequently requires a human inspector to evaluate and characterize the state of the manufacturing process based on spatial signatures in the data.

A spatial signature is a unique pattern of defects on the wafer surface which is associated with manufacturing problems. For example, a certain pattern might reveal problems with a wafer handler (e.g., a scratch), or with contamination in a chemical vapor deposition process (e.g., a random or skewed particle distribution). There are many unique signatures associated with semiconductor processing which can be used as a guide to quickly characterize and improve manufacturing.

The problem with the current manual method of wafer map evaluation is due to the limited number of wafers that can be manually evaluated in a given period of time and to the lack of objective and repeatable conclusions which can be reached in the decision making process by human inspectors. In general, while there are numerous data gathering techniques, the tools for analyzing the data need improvement in ways that will increase throughput and efficiently diagnose process limiting yield issues.

SUMMARY OF THE INVENTION

An object of the present invention is to provide a method and apparatus for spatial signature analysis which is capable of quickly and correctly evaluating wafer map data.

Another object of the present invention is to provide a method and apparatus for detecting and classifying patterns formed on semiconductor wafers.

Another object of the present invention is to provide a method and apparatus for processing wafer map information to provide a robust, non-subjective and repeatable signature identification which results in an enhanced ability to automate the operator pattern-search procedure. This, in turn, increases wafer map throughput and effectively reduces the number of defect locations required for re-detection during off-line, high-resolution review. This will lead to decreased time required to decreased time required to correct manufacturing problems which impact product yield.

These and other objects of the invention are met by providing a method of performing automated defect spatial signature analysis which includes the steps of producing a wafer map which includes data representing defect coordinates and wafer processing information, categorizing the data into a plurality of categories, each containing different types of signature events, and correlating a categorized signature event to a present or incipient anomalous process condition.

These and other objects of the invention will become more apartment from the following detailed description when taken in conjunction with the illustrative embodiments in the accompanying drawings.

DETAILED DESCRIPTION OF THE PREFERRED EMBODIMENT

The invention as described herein is an automated system for emulating the ability of an expert process engineer to view a picture of a wafer map, perform visual grouping and shape analysis, and then determine the health of the manufacturing process.

The method and apparatus of the invention can be implemented using a computer programmed as described hereinbelow. Initially, the defect data or "wafer map data" files are input into the system in either KLA-Results or Tencor-File (or any other suitable) format. The data is converted into an image which is analyzed using statistical and morphological techniques. Ultimate outputs are spatial signatures which fill into one of four event categories: global (or random) events, curvilinear events, amorphous events, or micro-structure events. These will be described in more detail below.

Figure 1:
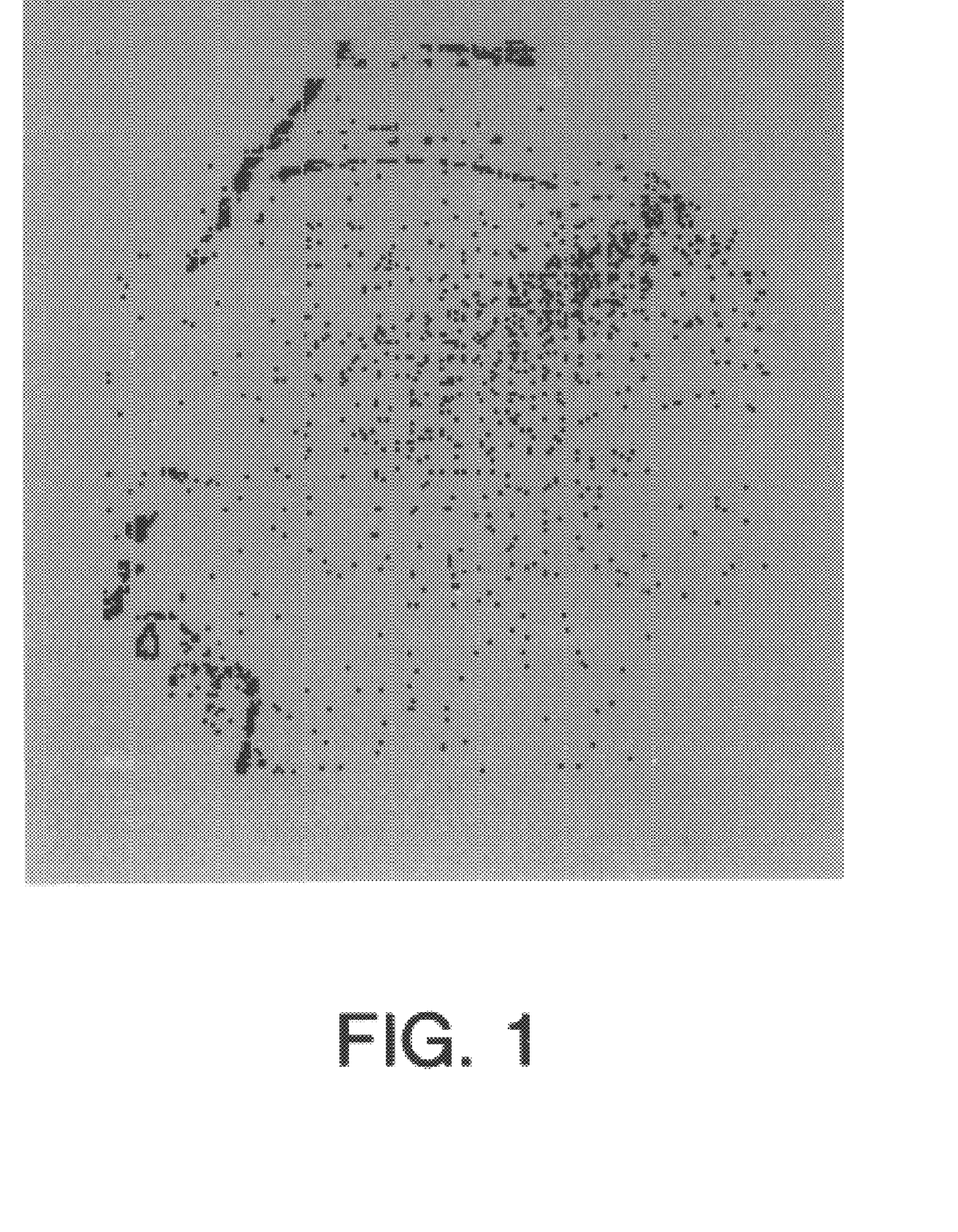
FIG. 1 is an example of a wafer map showing several spatial signatures, as a test wafer would appear on a computer screen or other display device associated with the apparatus of the present invention.

A general depiction of a wafer map is shown in FIG. 1. The figure shows several spatial signatures. The top of the map shows radial patterns attributable to a wafer-handling problem, the upper right shows particle contamination, and the lower left shows signs of mechanical damage which caused scratching.

Gray-scale images are created from the wafer map which have pixel-intensity values that represent the number of defects per unit area. The conversion of wafer maps pixel-intensity images applies a quadrature mapping (i.e., binning) of the defects into a density image. A fine-scale defect map can be generated at a user-selectable resolution. For example, a 512×512 pixel resolution represents a bin size of 390 $\mu$m×390 $\mu$m per pixel for a 200 mm diameter wafer.

Figure 2:
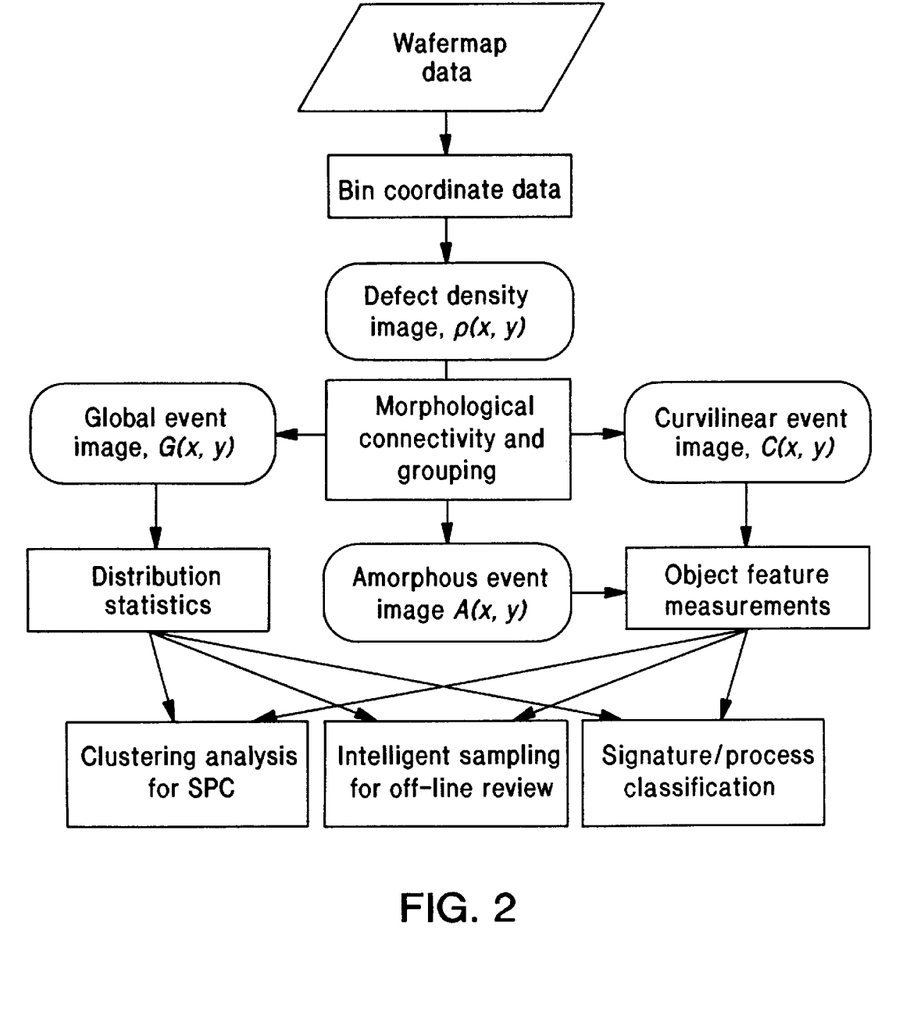
FIG. 2 is a flow chart showing processing steps for wafer map analysis according to the present invention.

FIG. 2 shows a flow chart for software used to implement the present system. A grey-scale density image $\rho(x,y)$, is generated from the electronic wafer map for processing. That density image can be considered a composite of several overlaying events within the wafer map data. The initial focus of wafer map signature analysis is to reduce the data set to simpler, non-overlapping (or nearly non-overlapping) sets that can be individually analyzed and finally classified to a user-defined class.

To accomplish this, four subgroups, into which a majority of all signature types fall, are defined. These high-level classes were determined to be optimal for this application after extended interviews with semiconductor fabrication personnel and an examination of several hundred wafer maps provided by Semiconductor Manufacturing Technology (SEMETECH) Consortium, of Austin, Tex., and its member companies. The classifications are defined as follows:

$G(x,y)$—global distribution—a logical grouping of unclustered single events associated with, for example, particle contamination in the manufacturing process;

$C(x,y)$—curvilinear distribution—curvilinear and radial clustered events associated with wafer spinning processes, mechanical surface damage, polishing anomalies, etc;

$A(x,y)$—amorphous distribution—nonlinear, tightly grouped cluster events arising from various processes, such as lithography, etch, watermarks, or particle stains; and $M(x,y)$—micro-structure—a collection of distributed single-pixel events which contain linear distributions of defects. These defect distributions reside on the image sub-pixel level and are related to small, fine micro-scratching from chemical and mechanical polishing for wafer planarization.

Density sub-images are components of the original density and, therefore, obey the conservation principle:

$$\rho(x,y)=G(x,y)+C(x,y)+A(x,y)+M(x,y)$$

The original density image, $\rho(x,y)$, is initially parsed into two categories based on defect density values: low-density, potentially random events and higher-density, potentially clustered events. This parsing is a first attempt to segment random defect distributions from other signature type events.

The low-density, random event image is then re-evaluated using a connectivity analysis to determine if some of the events should be removed and merged with the clustered-objects image. These initially random events may be moved back into the clustered image if connected groups of low-density defect pixels are found. For example, some shallow, short scratches will have a low density of defects per unit area, but will still appear as several connected pixels producing an elongated shape on the wafer map. This event is not a typical condition, but it does occur. Usually, non-random defects or clusters will have a high density of defects per unit area of the wafer.

The image for higher-density clustered events is binarized and operated on by a series of morphological processes. Those processes account for nearest-neighbor relationships as well as the relationship between large connected groups. Some standard dilation techniques are applied to the clustered image so that neighboring objects are grouped into single objects. Another effect of the dilation procedure, a morphological process, is to pull in some scattered defects around a single event. For example, a scratch will generate an elongated defect where the wafer was damaged. It will also scatter small particles of wafer material around the scratch.

Features of merged objects in the resulting image (area, elongation, compactness, proximity, etc.) are determined and then combined using fuzzy logic-type constraints. Output of the fuzzy constraint module then breaks the clustered event image into initial approximations of a curvilinear mask, $M_C(x,y)$, and an amorphous mask, $M_A(x,y)$. A "mask" is simply a binary image (values 0 or 1) used to filter out areas of the target image. Where the mask value is 0, areas are removed. The rest of the target image (where the value is 1) passes through. These masks are eventually used to generate the four final event images on a display device coupled to the computer.

Curvilinear processing requires a thorough understanding of the neighboring relationships between objects. Extensive study of wafer maps reveals that most elongated structures, such as scratches or radial events, consist of several disconnected segments. The algorithm must accommodate the segmented nature of elongated events when attempting to collect the segments realistically while maintaining object shape. The present invention directionally dilates objects based on the surrounding structure prior to the final feature measurement. The directional dilation technique is novel to this technique. Each object in the initial curvilinear mask, $M_C(x,y)$, is measured to determine a direction of desired elongation for a selected object, based on the distance, size and number of neighboring objects. An analogy can be made to the gravitational pull of one planetary object to another—a large mass (or area) or a close proximity results in a stronger directional pull.

Figure 3A:
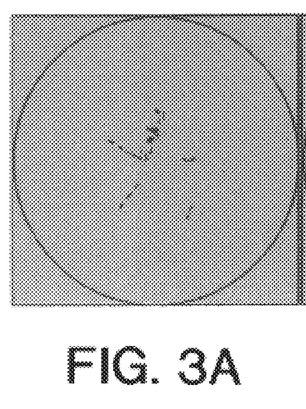
FIG. 3 illustrates directional dilation of a set of curvilinear clusters as seen from a computer screen generated by the apparatus of the present invention.
Figure 3B:
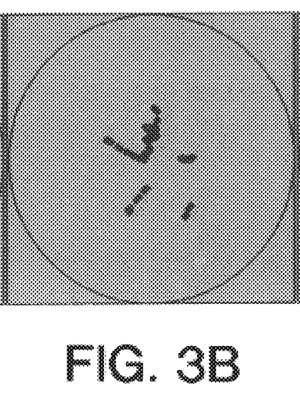
Figure 3C:
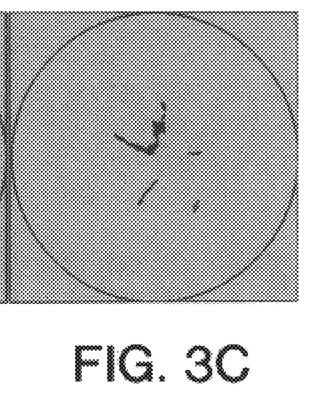

FIG. 3 illustrates directional dilation of a set of curvilinear clusters. In the (a) frame, there is shown a binary version of the distributed curvilinear-segmented cluster events. The (b) frame shows the resultant image following standard isotropic dilation, and the (c) frame show the directionally dilated result. In the (c) frame, the resulting objects are connected along preferential growth paths and the morphological features are more indicative of the true shape of the original curvilinear events.

Figure 4A:
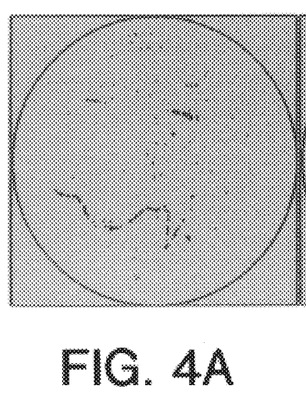
FIG. 4 illustrates masks generated by one of the fuzzy-constraint modules, with frame (a) showing the original wafer map, (b) showing the curvilinear mask, and (c) showing the amorphous mask.
Figure 4B:
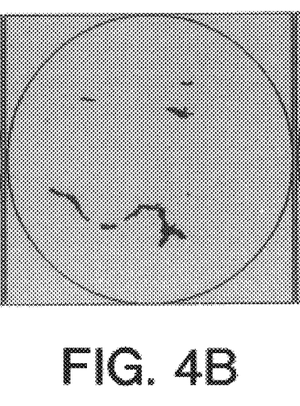
Figure 4C:
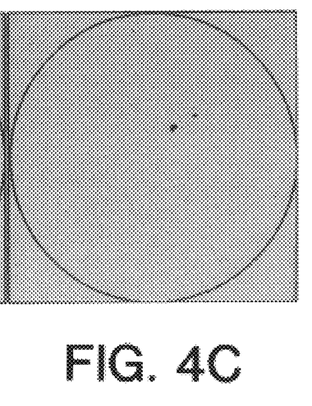
Figure 5A:
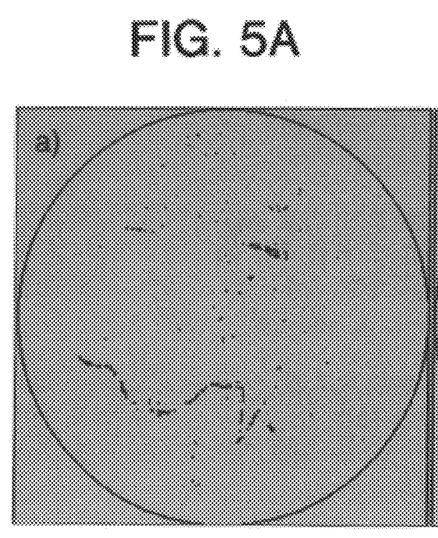
FIG. 5 shows the result of applying the masks of FIG. 4 to the original density image, and in particular, frame (a) shows the original wafer map, frame (b) shows the global or random defects, frame (c) shows the curvilinear clusters and frame (d) shows the amorphous clusters.
Figure 5B:
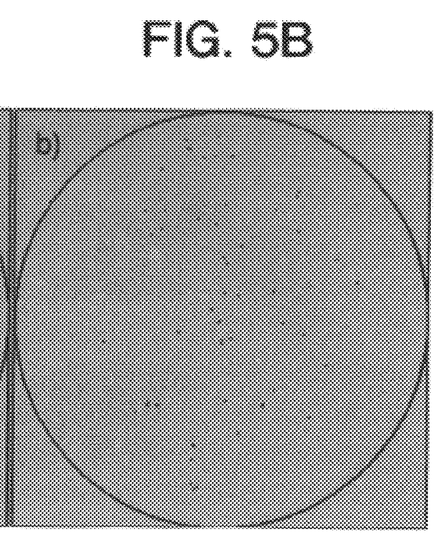
Figure 5C:
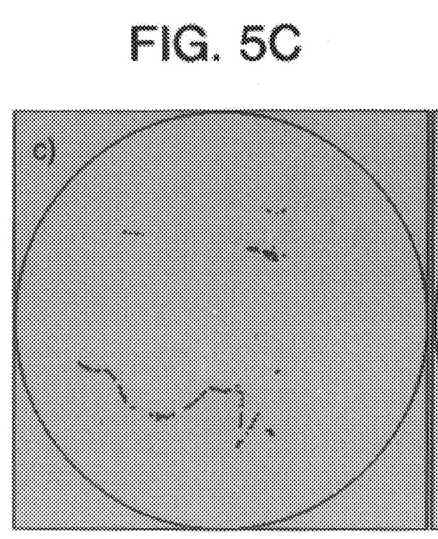
Figure 5D:
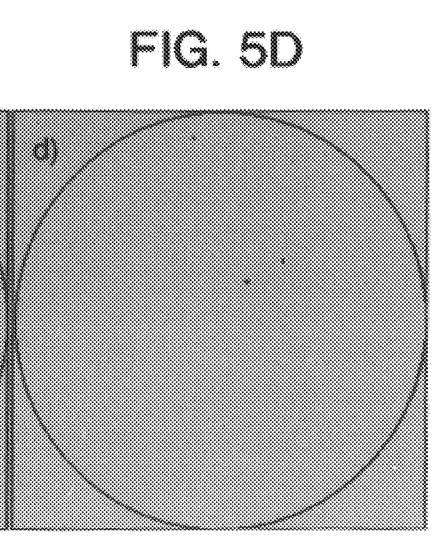

After the directional dilation is applied to the initial curvilinear image, several features of the new objects are calculated, including area, elongation, compactness, and proximity. These feature values then pass through a second fuzzy-constraint module to determine if any of the objects need to be removed from the curvilinear mask, $M_C(x,y)$, and sent back into the amorphous mask, $M_A(x,y)$. FIG. 4 shows the result of the process on a wafer map that has several curvilinear objects, a couple of amorphous patterns, and a scattering of random defects. Shown in sequence are the original wafer map in frame (a), the curvilinear mask in frame (b), and the amorphous mask in frame (c).

Once the final versions of $M_C(xy)$ and $M_A(x,y)$ have been obtained, they are added together, and the complement of the result is taken to generate the final global mask, $M_G(x,y)$. The final density images $C(x,y)$, $A(x,y)$, and $G(x,y)$ are then created by multiplying the corresponding mask by the original density image, $\rho(x,y)$. The output of the apparatus consists of three density images. The result of applying the masks of FIG. 4 to the original density image is shown in FIG. 5.

Distribution statistics are extracted from the global event image, and object feature measurements are extracted from the curvilinear and amorphous event images. That information is then fed into the following application areas: (1) clustering analysis for statistical process control ("SPC"); (2) intelligent sampling for off-line review, and (3) signature/process clarification.

SPC charts that monitor just the total defect count tend to vary widely in the presence of multiple defect events, such as scratches. Modified SPC that monitors different categories of spatial signatures separately from the random defect distributions will provide a more accurate picture of the health of the manufacturing process.

Figure 6:
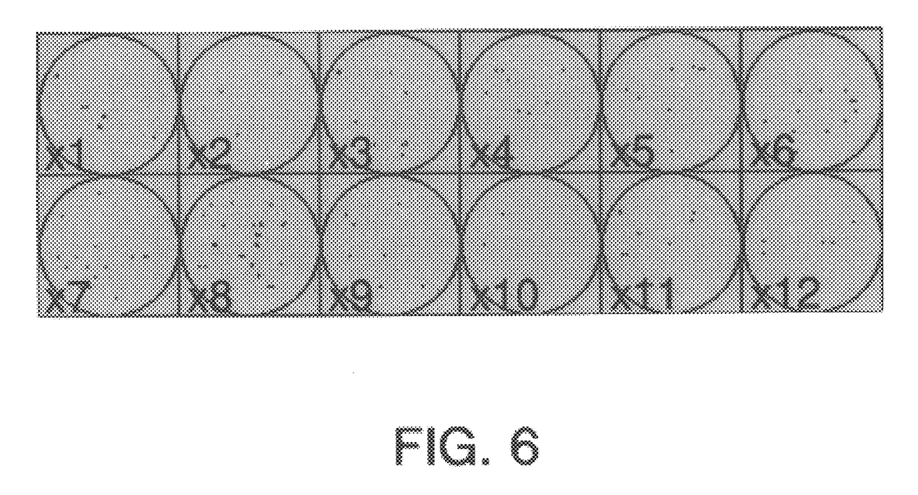
FIG. 6 illustrates a series of wafer maps from the same manufacturing lot.
Figure 7:
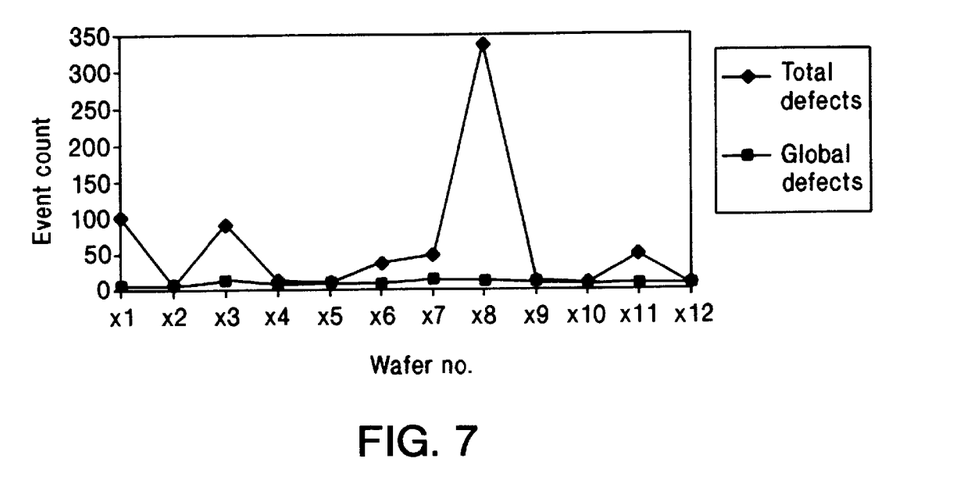
FIG. 7 is a graph of event count versus after number, generated by the apparatus of the present invention and as displayed on a display device.

An example of the method and apparatus of the present invention is illustrated with reference to FIG. 6, which shows a series of wafer maps from the same manufacturing lot. They have a combination of random defects and a few clusters. Overall, however, the defect density across the wafers is low. FIG. 7 shows the plots of event count versus wafer number for both total defects and random defects after amorphous clusters were removed via data manipulation according to the invention. Conspicuously, the total defect count varies widely, because some of the small amorphous events that occurred on wafers x1, x2, and x8 have high defect densities. If those amorphous events are removed (or monitored separately) it is seen that the number of global or random defect events is consistently low.

The invention can be used to perform intelligent sampling of wafer defects for off-line review and automatic defect classification. Only a small sampling of the defects that are part of one process "event," or signature, need to be examined in detail for high resolution analysis.

The invention can also be used for on-line quality control. A system could automatically monitor wafer maps to look for process-specific signatures and then sound an alarm when anomalous conditions arise. thus, potential equipment problems can be identified before yield is affected. Furthermore, a system that not only sets an alarm, but also directs maintenance personnel to the specific piece of faulty equipment, would provide a key link in the cycle of problem emergence, identification and correction.

Figure 8A:
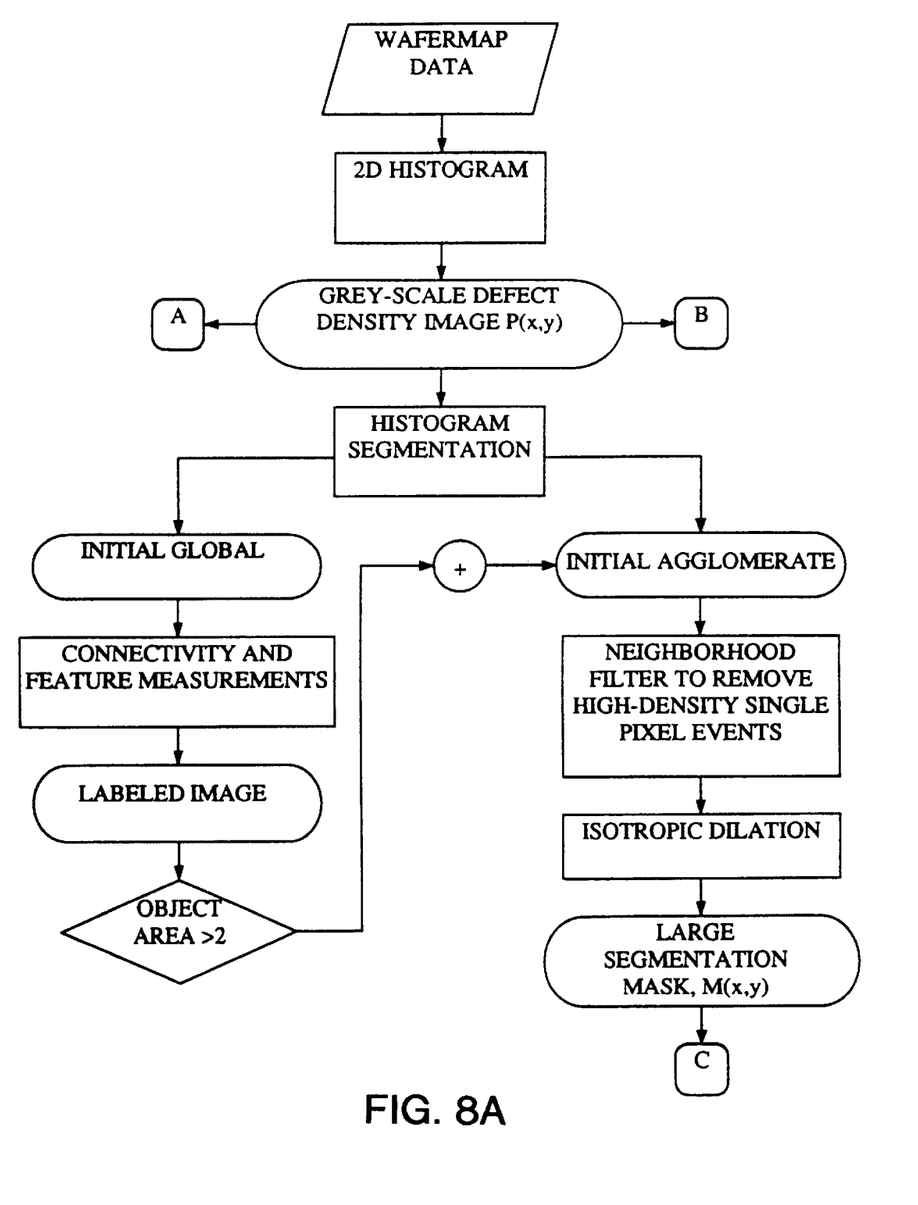
FIG. 8 is a flow chart of a program for implementing the present invention.
Figure 8B:
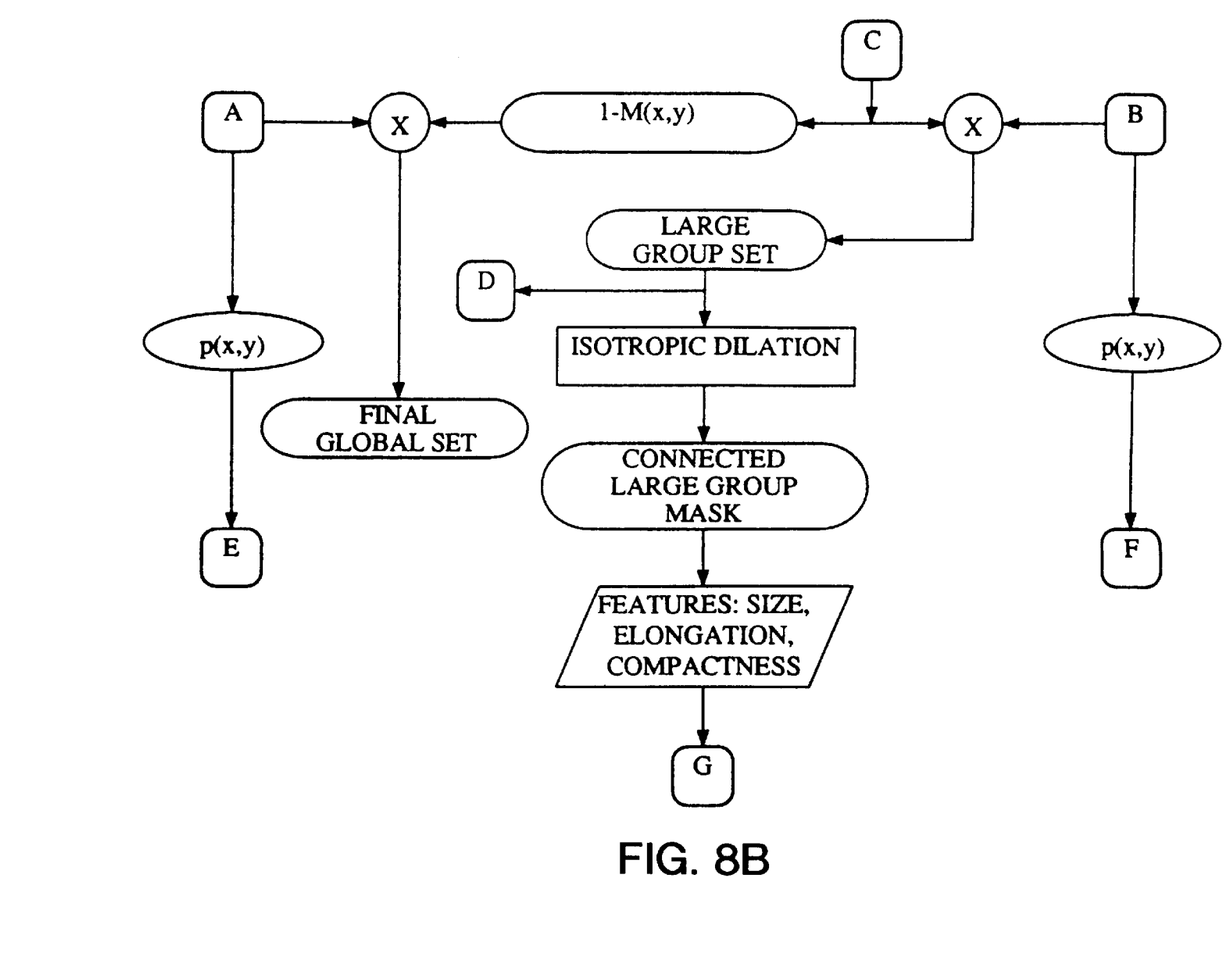
Figure 8C:
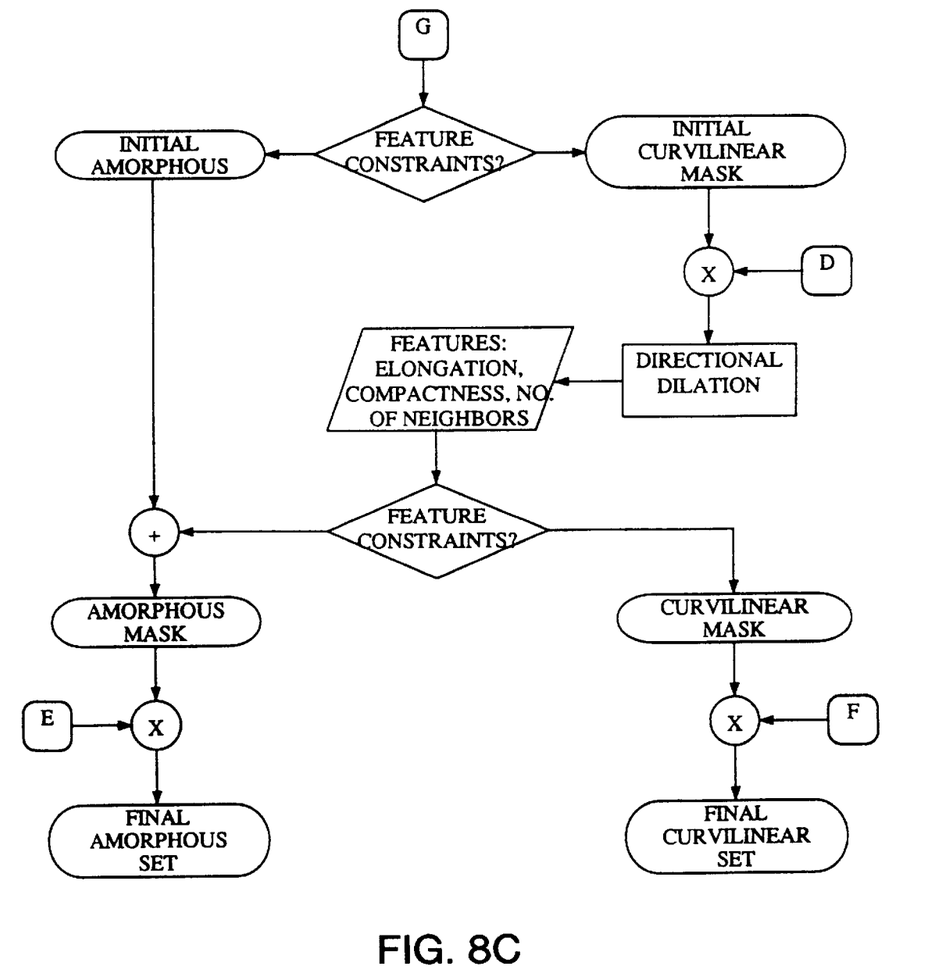

FIGS. 8(a)–(c) provide a detailed flow chart for the software implementation of the present invention, and is essentially an expanded and more detailed version of the flow chart of FIG. 2.

Figure 9:
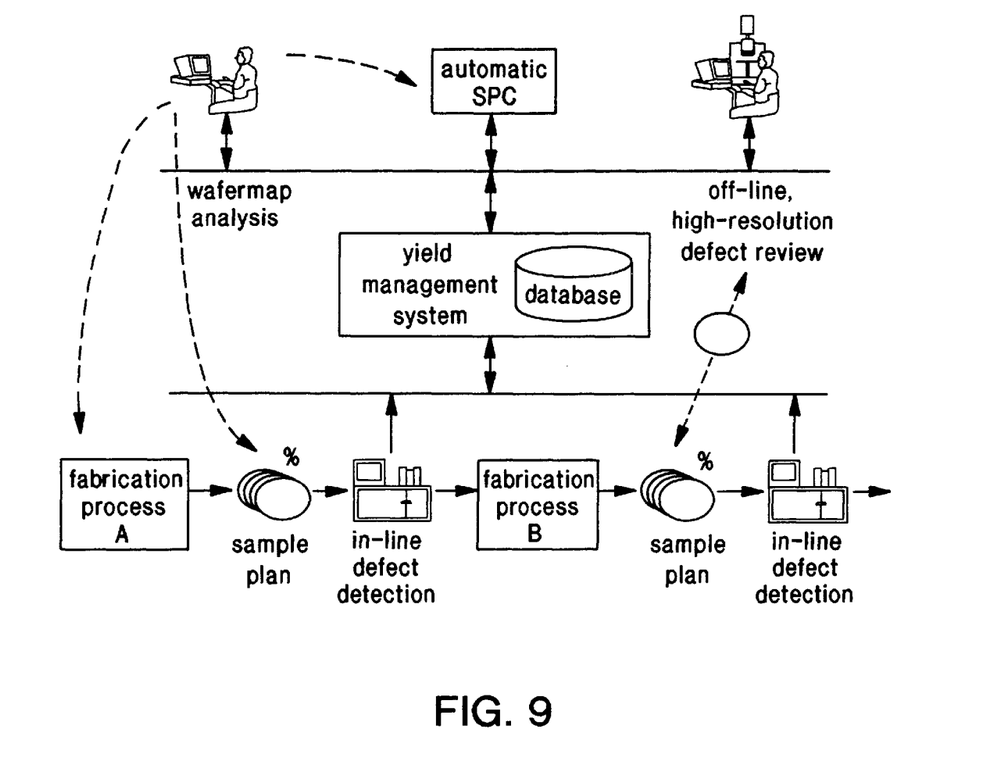
FIG. 9 is a schematic view of a wafer fabrication process showing inspection points and analysis tools, with dashed lines representing control actions taken by fab personnel for modifying the process, sample plan, etc.

FIG. 9 shows a system for collecting and analyzing defect data in a production environment. As wafers exit a fabrication process station "A" wafer map data is generated by an in-line defect detection workstation generally incorporating a microscopy or light-scattering system. A sampling plan is implemented which encompasses a small percentage of batch or "lot" of wafers (e.g., 20% of wafers in a given lot).

Once a wafer has been scanned by the instrument, its electronic wafer map is moved to a yield management system which includes a database where some level of automatic statistical process control may be used to count "events." Events are occurrences on the wafer which were sensed by the in-line defect detection tool and may arise from particle contamination, mechanical damage, process variations, or process excursions. The analysis, in the form of a computer program, counts events and develops trend data which can be used for prediction or to alarm operators when a process is going out of specification or when maintenance or calibration must be scheduled.

A smaller percentage of the wafer map data (e.g., 20% of the sampling plan, or one lot out of every five lots) will be manually inspected unless the statistical process control requires otherwise. The information in the wafer map consists of detected defect coordinates as well as process information such as step, layer, and product.

The existence of patterns in the wafer map data is typically observed manually by an operator viewing a plot of the coordinate points during analysis. the wafer map data may be combined or "stacked" across wafers in a lot or across lots to better view the evolution of process signatures which may assist in diagnosing manufacturing problems that may be too subtle on a per wafer basis. Also, a sub-sample plan may be developed during manual wafer map analysis prior to off-line, high-resolution defect review. Off-line review takes place on a microscopy workstation and attempts to classify the defect (i.e., discern the exact type and cause of the defect) by viewing, at high resolution (e.g., 0.01 $\mu$m/pixel), individual defect morphology, color, texture, or relationship to process or layer (e.g., extra-pattern due to an insufficient etch or lithography problem).

Typically, a coordinate map may contain several hundred to several thousand defects which must be manually reviewed and classified during off-line review. An event such as a large scratch may contain hundreds of individually detected defects all originating from the same cause. A pre-analysis of signatures on the wafer map can result in an efficient high resolution sampling plan which greatly reduces the number of defects which must be manually revisited.

The automated process of the present invention is achieved by at first pixelating the wafer map data to provide a defect density map where the intensity of each pixel is indicative of the defect density at that location. After pixelation, a series of local and global process steps are applied. Local processing uses the relationship between nearest-neighbor defects (distances on the order of 1 μm to 10 μm) to initially group points into events. Global processing (distances on the order of 1 mm to 10 nn) uses the shape, size, and proximity of these initial event groups along with a grouping process referred to previously as directional dilation to further the clustering. The result is an electronic results file containing signature classification information and process statistics (e.g., event counts) which are used by the plant engineer to characterize the manufacturing process and improve product yield.

The automated analysis of the present invention can be used to solve a variety of industrial quality and metrology inspection problems. The methodology could be applied to any manufacturing process which results in distributed product defects arising from a common process cause. For example, it could be used to detect defects (similar to semiconductor defect creation mechanisms) in flat panel display manufacturing; inclusions and pinch roller damage defects in continuously formed sheet steel and aluminum; yarn defects, print registration, rotary screen defects in continuously manufactured/finished textiles; holes, contamination and roller anomaly defects in continuously manufactured/finished paper products; bubbles, inclusions, and delaminations in continuously manufactured thin film materials; scaring, insect damage, and mechanical handling defects in leather tanning and finishing; and correction of low quality text representations in document processing and optical character recognition.

Although the invention has been described with reference to a particular embodiment, it will be understood to those skilled in the art that the invention is capable of a variety of alternative embodiments within the spirit and scope of the appended claims.

What is claimed is:

1. A method of performing automated defect spatial signature analysis on a data set representing defect coordinates and wafer processing information, comprising the steps of:

categorizing data from the data set into a plurality of high level event categories including global events, curvilinear events, amorphous events, and micro-structure events;

classifying the categorized data contained in each high level category into user-labeled signature events; and correlating the categorized, classified signature events to a present or incipient anomalous process condition.

2. A method according to claim 1, wherein the categorizing step includes generating a grey-scale density image $\rho(x,y)$ from the data set and inputting the grey-scale density image to means for performing the classifying step.

3. A method according to claim 2, wherein the density image is a composite of several overlaying events within the data set.

4. A method according to claim 3, further comprising reducing the data set to simpler, non-overlapping or nearly non-overlapping sets that can be individually analyzed to assign the user-labeled signature events.

5. A method according to claim 1, wherein the global events category is defined as including any unclustered single pixel events, the curvilinear category is defined as including any curvilinear and radial clustered events associated with wafer spinning processes and mechanical surface damage, polishing anomalies, the amorphous category is defined as including nonlinear, tightly grouped cluster events arising from various processes, including lithography, etch, watermarks, and particle stains, and the microstructure category is defined as a collection of distributed single-pixel events which contain laser distributions of defects which reside on the image sub-pixel level and are related to small fine micro-scratching from chemical and mechanical polishing for wafer planarization.

6. A method of performing automated defect spatial signature analysis on a data set representing defect coordinates and wafer processing information, comprising the steps of:

forming a density image, $\rho(x,y)$, from the data set;

parsing the density image into two categories based on defect density values: low-density, potentially random events and higher-density, potentially clustered events, thereby segmenting random defect distributions from other signature type events;

classifying the data contained in each category into user-labeled signature events; and correlating the categorized, classified signature events to a present or incipient anomalous process condition.

7. A method according to claim 6, further comprising re-evaluating the low-density, random event image using a connectivity analysis to determine if some of the events should be removed and merged with the clustered-objects image.

8. A method according to claim 7, further comprising moving the initially random events back into the clustered image if connected groups of low-density defect pixels are found.

9. A method according to claim 6, further comprising binarizing the images for higher-density clustered events and processing the binarized imaged to account for nearest-neighbor relationships and relationships between large connected groups.

10. A method according to claim 9, wherein the processing includes applying a dilation technique to the clustered images so that neighboring objects are grouped into single objects, thereby pulling in some scattered defects around a single event.

11. A method according to claim 10, further comprising determining the features of the resulting image, wherein the features include area, elongation, compactness, and proximity, and then combining the measured features using fuzzy logic-type constraints.

12. A method according to claim 11, further comprising breaking the combined features into initial approximations of a curvilinear mask, $M_C(x,y)$, and an amorphous mask, $M_A(x,y)$.

13. A method according to claim 12, wherein the mask is a binary image used to filter out areas of the target image, whereby if the mask value is 0, areas are removed and a remainder of the target image where the value is 1 passes through, and wherein the masks are eventually used to generate three final event images on a display device coupled to a computer.

14. A method according to claim 13, further comprising directionally dilating objects based on surrounding structure prior to final feature measurement.

15. A method according to claim 14, wherein each object in the initial curvilinear mask, $M_C(x,y)$, is measured to determine a direction of desired elongation for a selected object, based on the distance and size of neighboring objects.

16. A method according to claim 6, wherein the data set is wafer map data.

17. A method according to claim 6, wherein the data set is flat panel display data.

18. An apparatus for performing automated defect spatial signature analysis on a data set representing defect coordinates and wafer processing information, comprising:

means for categorizing data from the data set into a plurality of high level categories including global events, curvilinear events, amorphous events, and micro-structure events;

means for classifying the categorized data contained in each high level category into user-labeled signature events; and means for correlating the categorized, classified signature events to a present or incipient anomalous process condition.

19. An apparatus according to claim 18, wherein the categorizing means includes means for generating a grey-scale density image $\rho(x,y)$ from the data set and means for inputting the grey-scale density image to the classifying means.

20. An apparatus according to claim 19, wherein the density image is a composite of several overlaying events within the data set.

21. An apparatus according to claim 20, further comprising means for reducing the data set to simpler, non-overlapping or nearly non-overlapping sets that can be individually analyzed to assign the user-labeled signature events.

22. An apparatus according to claim 19, wherein the global events category is defined as including any unclustered single pixel events, the curvilinear category is defined as including any curvilinear and radial clustered events associated with wafer spinning processes and mechanical surface damage, polishing anomalies, the amorphous category is defined as including nonlinear, tightly grouped cluster events arising from various processes, including lithography, etch, watermarks, and particle stains, and the micro-structure category is defined as a collection of distributed single-pixel events which contain linear distributions of defects which reside on the image sub-pixel level and are related to small fine micro-scratching from chemical and mechanical polishing for wafer planarization.

23. An apparatus according to claim 19, further comprising means for forming a density image, $\rho(x,y)$, and parsing the density image into two categories based on defect density values: low-density, potentially random events and higher-density, potentially, clustered events, thereby segmenting random defect distributions from other signature type events.

24. An apparatus according to claim 23, further comprising means for re-evaluating the low-density, random event image using a connectivity analysis to determine if some of the events should be removed and merged with the clustered-objects image.

25. An apparatus according to claim 24, further comprising means for moving the initial random events back into the clustered image if connected groups of low-density defect pixels are found.

* * * * *